May 15, 1923.
W. TURNBULL
MASTER CLUTCH
Filed May 25, 1918
1,455,460
2 Sheets-Sheet 1
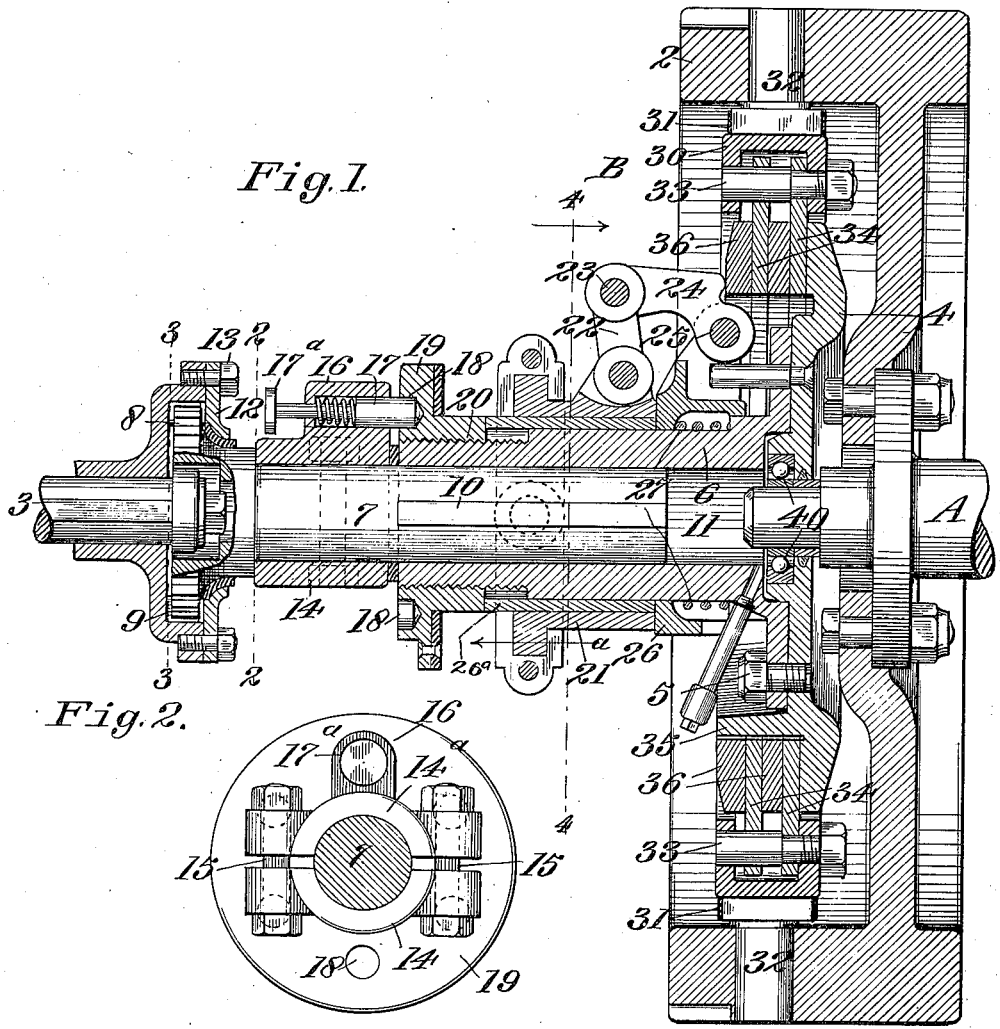
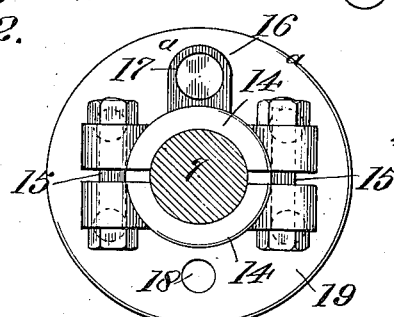
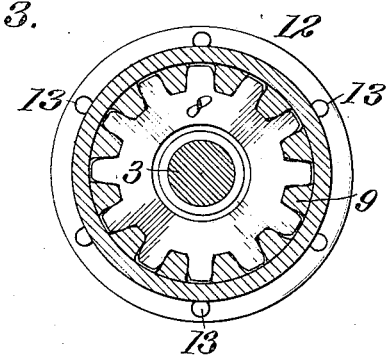
INVENTOR.
William Turnbull
BY
Strong & Townsend
ATTORNEY May 15, 1923.

W. TURNBULL

MASTER CLUTCH

Filed May 25, 1918

INVENTOR.
William Turnbull
BY
Strong & Townsend
ATTORNEYS

Patented May 15, 1923.

1,455,460

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

MASTER CLUTCH.

Application filed May 25, 1918. Serial No. 236,522.

*To all whom it may concern:*

Be it known that I, WILLIAM TURNBULL, a citizen of the United States, residing at Peoria, in the county of Peoria and State of Illinois, have invented new and useful Improvements in Master Clutches, of which the following is a specification.

This invention relates generally to improvements in clutch devices, and pertains especially to a master or engine clutch for traction engines and the like, wherein flexibility and variable speeds combined with great strength are the essentials.

One of the objects of the present invention is to provide a clutch of the multiple disk type which is adapted to be interposed between the engine flywheel and the transmission shaft on a tractor or the like, and which is so constructed and assembled that it may be removed or inserted whenever desired without disturbing the flywheel or the transmission shaft.

Another object of the invention is to provide a universal floating driving connection between the clutch, the flywheel and the transmission shaft to take care of any misalignment or operating strains between the engine shaft and the transmission shaft.

Another object of the invention is to provide a novel adjusting mechanism whereby any wear between the clutch disks and the operating dogs may be readily taken up and all the dogs adjusted in unison.

Further objects will hereinafter appear.

The invention consists of the parts and the combination and construction of parts as hereinafter more fully described and claimed, having reference to the accompanying drawings in which—

Fig. 1 is a central vertical longitudinal section through the clutch showing it interposed between the flywheel and the transmission shaft.

Fig. 2 is a cross section on line 2—2, Fig. 1.

Fig. 3 is a cross section on line 3—3, Fig. 1.

Figure 4:
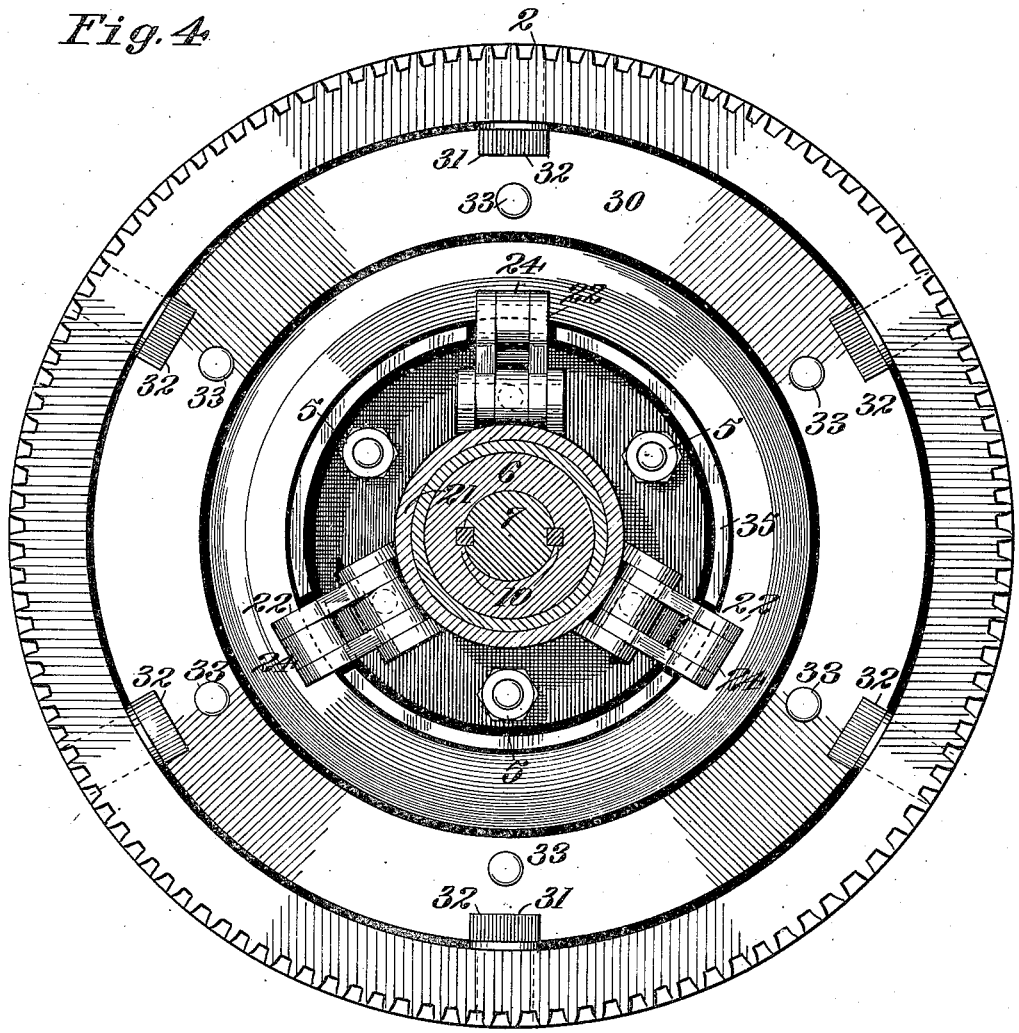
Fig. 4 is an end view and cross section on line 4—4, Fig. 1.

Referring to the drawings in detail, A indicates an engine shaft, and 2 a flywheel suitably secured thereto. 3 is a transmission shaft which is journaled in approximate alignment with the engine shaft, and connectable and disconnectable at will with said shaft through the clutch mechanism generally indicated at B. Turnably mounted on the outer end of the engine shaft is a disk 4, and secured thereto by means of bolts 5 is a hub extension 6 which is adapted to receive an intermediate shaft 7, on the outer end of which is secured a spur gear pinion 8. This pinion intermeshes with an internal gear 9 carried by the transmission shaft, and in this manner forms a flexible connection between the shafts 3 and 7, which provides the necessary adjustment due to any misalignment between the engine shaft and the transmission shaft; and also any misalignment due to operating strains. The intermediate shaft is splined with relation to the hub 6, as shown at 10, and it is free to move endwise within the hub to permit insertion or removal of the clutch as a whole as will hereinafter be described. A space 11 is formed between the inner end of the intermediate shaft and the outer end of the engine shaft to permit endwise movement of the intermediate shaft within the hub, the intermediate shaft being under normal operating conditions locked against endwise movement, first by an annular flange 12 secured on the end of the transmission shaft by means of bolts 13, and secondly by a split collar 14, which engages the end of the hub member 6. This split collar is formed in two sections, 14 and 14$^a$, which are secured together by bolts 15. The upper section, 14$^a$, of the collar is provided with a boss 16, on which is mounted a spring actuated latch 17. This latch is normally projected as shown in Fig. 1, and when so projected enters one or another of a plurality of pockets 18 formed in a nut 19, which is carried by the outer end of the hub 6, said hub end being threaded as at 20, for the reception of the nut. Slidably mounted on the hub 6 is a shifting collar 21, and pivotally attached to said collar is a plurality of links 22, the outer ends of which are pivotally attached as at 23, to dogs 24, each dog shown being pivotally attached at its inner end as at 25, to a collar 26, which is also carried by the hub 6. A sleeve 26$^a$ is carried on the hub 6 between the nut 19 and collar 26 and serves as a spacer element for these parts. A spring 27 is interposed between a shoulder on the hub 6 and the member 26, thus normally retaining the member 26 and the shifting collar 21 in engagement with the adjusting nut 19. Mounted within the rim of the flywheel as shown in Figs. 1 and 4 is an annulus 30. This annulus is slotted as at 31 around its periphery to permit square headed bolts such as shown at 32, to enter the slotted portions. These bolts are secured in the rim of the flywheel, and form a sliding coupling or driving connection between the annulus and the flywheel. Secured by means of bolts 33, carried by the annulus is a plurality of friction disks 34, and carried by a hub member 35 formed on the disk 4 is a plurality of friction disks 36. These disks are splined to the hub member 35, and may therefore be moved to or away from the disk 4 and the disks 34 carried by the annulus 30 when the dogs 24 are raised and lowered by means of the links 22 and the shifting collar 21.

In the position shown in Fig. 1 the clutch is engaged, with the links 22 just across their center so that they will be normally held in this position without any spring action. A driving connection is in this manner formed between the annulus 30, which is carried by the flywheel and the disk 4, and power may therefore be transmitted through said disk, the hub 6 and the intermediate shaft 7 to the flexible coupling comprising the gears 8 and 9 and the transmission shaft; any misalignment between the transmission shaft and the engine shaft, due to structural faults or due to operating strains, being taken care of in the present instance, first by the connection between the flywheel and the annulus and secondly by the flexible connection between the floating intermediate shaft and the transmission shaft, a ball bearing 40 being preferably interposed between the disk 4 and the engine shaft to provide for additional adjustment due to any misalignment which may take place. To release the clutch the collar 21 is drawn backwardly in the direction of the arrow $a$, thus moving the links 22 across their center and finally turning the levers 24 toward the axis of the shaft.

If through wear or any other cause it is desired to take up any play between the friction disks and the operating dogs 24, it will only be necessary to retract the latch 17, and to turn the adjusting nut 19 in the proper direction. This will force the collar 26, and also the shifting collar 21, inwardly toward the clutch disks, thereby readily taking up any wear or play that may exist, the nut 19 being immediately locked when the parts have been adjusted by merely releasing the latch 17, which is spring actuated as shown, and provided with a head 17ª to permit it to be released when desired.

Another important feature of the present invention is the provision of the split collar 14 and the floating sliding connection between the intermediate shaft and the driving hub 6. This is provided for the purpose of permitting the clutch to be readily removed or inserted whenever desired. For instance, if it is necessary to remove the clutch, it is accomplished by first removing the annular flange 12, which is secured to the transmission shaft by the screws 13. The split collar 14 is next released and taken off the intermediate shaft. This immediately permits the intermediate shaft to be moved endwise against the engine shaft, thereby pulling the gears 8 and 9 out of mesh, and also permitting the annulus to be moved endwise out of engagement with the square headed bolts 32. The whole clutching mechanism is in this manner quickly and readily removed without disturbing the flywheel, the engine shaft bearings or the transmission shaft bearings, or without any necessity of moving either the engine shaft or the transmission shaft endwise. The clutch is just as readily replaced, as it is only necessary to insert the annulus carrying the clutching mechanism as a whole back in place between the square headed bolts 32 carried by the flywheel rim, next to extend the intermediate shaft and secure it by the flange 12, and finally to secure it in place and against endwise movement by applying the split collar 14, this collar simultaneously serving as a support for the latch 17, which locks the adjusting nut 19 against turning movement after adjustment of the friction disks of the clutch and the dogs has taken place.

The mechanism as a whole is simple and substantial in construction, and as it is flexibly connected both with the transmission shaft and the flywheel, it can readily be seen that it is exceedingly suitable for traction engines and like devices as it permits heavy loads to be transmitted without straining any of the connected parts.

Having thus described my invention, what I claim and desire to secure by Letters Patent is—

1. The combination with an engine shaft and a flywheel carried thereby of a transmission shaft, an annulus within the flywheel, a driving connection between the annulus and the flywheel, a multiple disk clutch having its driving disks carried by the annulus, a hub member carrying the driven disks of the clutch, an intermediate shaft splined and slidably mounted endwise within the hub member, and an interlocking driving connection between the intermediate shaft and the transmission shaft, said interlocking connection being disengageable and the clutch mechanism being removable from the fly-wheel when the intermediate shaft is telescoped.

2. The combination with an engine shaft and a flywheel carried thereby of a transmission shaft, an annulus within the flywheel, a driving connection between the annulus and the flywheel, a multiple disk clutch having its driving disks carried by the annulus, a hub member carrying the driven disks of the clutch, an intermediate shaft splined and slidably mounted endwise within the hub member, an interlocking driving connection between the intermediate shaft and the transmission shaft, and a split collar adapted to embrace the intermediate shaft and lock it against endwise movement within the hub member, said interlocking connection being disengageable and the clutch mechanism being removable from the fly-wheel when the intermediate shaft is telescoped.

3. The combination with an engine shaft and a flywheel carried thereby of a transmission shaft, an annulus within the flywheel, a driving connection between the annulus and the flywheel, a multiple disk clutch having its driving disks carried by the annulus, a hub member on the clutch, an intermediate shaft splined and slidably mounted endwise within the hub member, an interlocking driving connection between the intermediate shaft and the transmission shaft, a split collar adapted to embrace the intermediate shaft and lock it against endwise movement within the hub member, a plurality of dogs adapted to move the disks in the clutch into and out of engagement with each other, and a single means for simultaneously adjusting the position of all the dogs.

4. The combination with a crank shaft and fly wheel of a frictional disk clutch mechanism arranged within the annulus of the fly wheel and having its driving member removably connected to the annulus of the fly wheel, a shaft driven by said clutch mechanism, connecting means between the driven clutch member and the driven shaft comprising a hub carrying the driven clutch members, a shaft telescopically received within the hub, an interlocking connection between the telescopic shaft and the driven shaft and a removable collar interposed between the telescopic shaft and the hub for retaining the shaft in position where the interlocking connections will be engaged.

5. The combination with a crank shaft and fly wheel of a frictional disk clutch mechanism arranged within the annulus of the fly wheel and having its driving member removably connected to the annulus of the fly wheel, a shaft driven by said clutch mechanism, connecting means between the driven clutch member and the driven shaft, said connecting means comprising a two-part telescopic driving device, an internal toothed member on the driven shaft, an external toothed member on the adjacent end of the telescopic device to co-operate with the internal toothed member, and a removable collar interposed between the parts of the telescopic device for maintaining said parts in extended position where the toothed members will be engaged.

6. In combination with driving and driven shafts in alignment, the driving shaft carrying a fly-wheel, of a frictional disk clutch assembly interposed between the driving and driven shafts, a member carrying the driving disks of the clutch, interlocking and slidable connections between the rim of the fly-wheel and said carrying member, a telescopic member connected to the driven disks of the clutch for transmitting motion of the latter, and an interlocking and slidable connection between said telescopic member and the driven shaft, said interlocking connections being engageable when the telescopic member is extended and disengageable when retracted, whereby to permit removal of the clutch assembly without disturbing the position of the driving and driven shafts.

In testimony whereof I have hereunto set my hand in the presence of two subscribing witnesses.

WILLIAM TURNBULL.

Witnesses:
EMIL F. MORELINS,
H. B. BAKER.